United States Patent [19]

Ameseder

[11] Patent Number: 4,798,505
[45] Date of Patent: Jan. 17, 1989

[54] PROCESS AND APPARATUS FOR REMOVAL OF DUST AND CHIP MATERIAL AT THE MACHINING STATION OF A MACHINE TOOL

[75] Inventor: Anton Ameseder, Rorschach, Switzerland

[73] Assignee: Starrfrasmaschinen AG, Rorschacherberg, Switzerland

[21] Appl. No.: 885,950

[22] Filed: Jul. 15, 1986

[30] Foreign Application Priority Data

Jul. 16, 1985 [CH]  Switzerland .................. 3090/85
Jun. 17, 1986 [CH]  Switzerland .................. 2458/86

[51] Int. Cl.[4] ............................................ B23Q 11/12
[52] U.S. Cl. ............................ 409/136; 29/DIG. 91;
  175/208; 408/61; 409/137
[58] Field of Search .............. 409/136, 137; 408/61,
  408/68, 57; 82/DIG. 2; 29/DIG. 78, DIG. 87,
  DIG. 91; 175/208

[56] References Cited

U.S. PATENT DOCUMENTS 1,611,028 12/1926 Harrison ........................ 175/208
2,327,483 8/1943 Aitchison et al. ............ 29/DIG. 91
2,404,149 7/1946 Trinkle ........................... 409/136
2,644,275 7/1953 Hoguet .......................... 51/439
2,837,972 6/1958 Knowles ..................... 409/136 X
3,245,321 4/1966 Dankonin et al. .......... 409/136 X Primary Examiner—Z. R. Bilinsky
Attorney, Agent, or Firm—Helfgott & Karas

[57] ABSTRACT

On the tool spindle of a machine tool, a hollow ring is mounted on the headstock or on the sleeve flange thereof and is provided on its underside with an annular clearance forming an endless ring nozzle. A pressurized fluid is introduced into the channel of the hollow ring and passes out of the annular clearance in the form of a closed fluid curtain, so that a closed space surrounding the machining station is formed. So as to obtain a permanent seal with the fluid curtain, an annular element comprising a deflecting ring, a filter ring and a straightening ring is built into the annular channel and as a result the latter is subdivided into an upper and a lower partial ring channel. The suspended dust formed during the machining of a workpiece is held back by the fluid curtain, but the machining point is still visible and unimpeded access is possible.

10 Claims, 2 Drawing Sheets

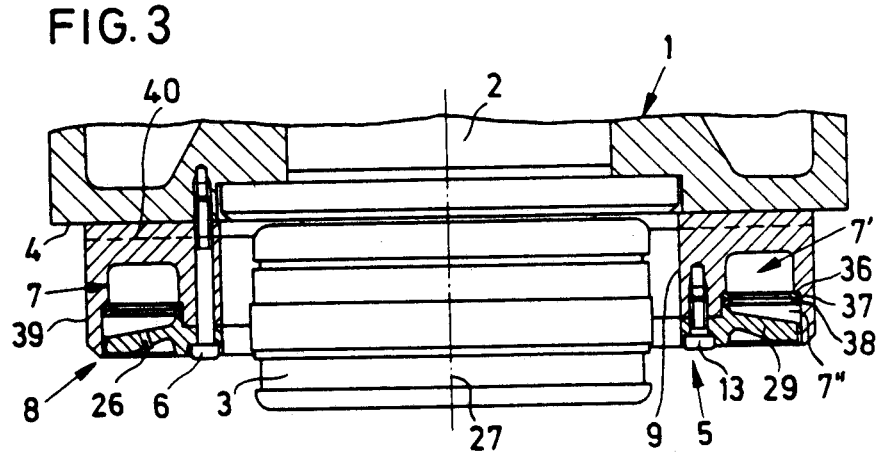
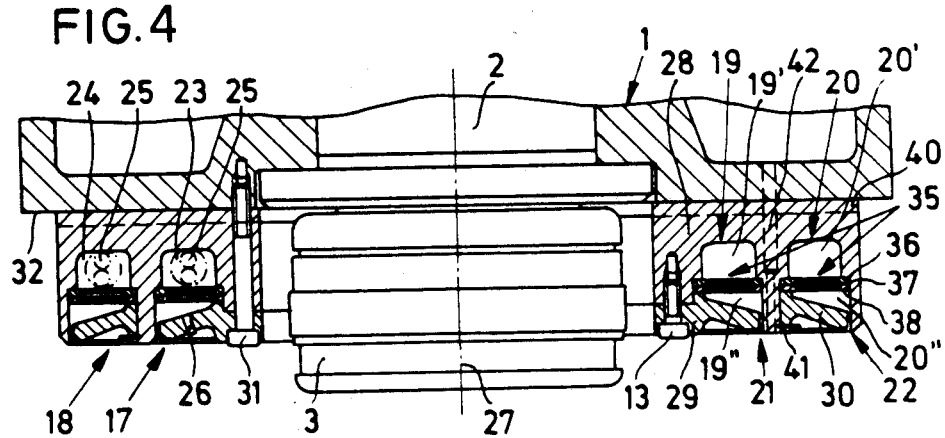

PROCESS AND APPARATUS FOR REMOVAL OF DUST AND CHIP MATERIAL AT THE MACHINING STATION OF A MACHINE TOOL

BACKGROUND OF THE INVENTION

The present invention relates generally to machine tools and more particularly, to a process and apparatus for minimizing dust production and for the removal of chip material at the machining station of a machine tool during the machining of workpieces. Even more specifically, the present invention relates to the machining of workpieces made from graphite in which a fluid is supplied to the machining point and this serves to trap the graphite dust which is combined with the fluid and is removed together with the chips from the machining point, as well as to an apparatus for performing this process.

It is known that, during the machining of workpieces from particular materials, there is a considerable production of dust, which is not only unpleasant and prejudicial to the health of the workers, but also leads to stoppages of the machines and to the contamination of the working area. Such a material is, for example, graphite, which is used in the production of a great variety of electrode types for use on spark erosion machines. Graphite workpieces are appropriately shaped by machining, e.g. by milling.

For the protection of workers and machines against the suspended dust produced when working graphite, it is known to use transparent covering hoods. However, as workpieces with the most varied shapes are produced, the hoods must be adapted to the workpieces individually. Even so, the hoods impede vision and the working space. In addition, the constantly changing of the movement tool and particularly in vertical movement, permits no fixed covering between tool and workpiece without creating a considerable accidental risk. The use of elastic covers, e.g. elastic hoods, is also ineffective in reducing the aforementioned disadvantages.

To improve this known process, another process is known, which is particularly used in the dry working of graphite workpieces. Strong industrial vacuum cleaners are used for sucking up chips and dust produced in the vicinity of the working station, e.g. at the point of action of the milling cutter. However, the constantly changing interaction of the tool or cutter with the workpiece during working makes a satisfactory removal thereof impossible. In addition, the voluminous suction lines with the suction nozzle obstruct the working area. Moving the suction nozzle by hand does not represent a satisfactory solution and also increases risks of injury. In the case of multiple spindle machines, this type of dust removal becomes even more problematic due to the resulting considerable expenditure on material and space. If additional suction hoods are used, their efficiency decreases considerably and conventional suction or exhausting equipment is no longer adequate, so that rooms and work areas become even dustier.

It is also known to replace the aforementioned dry working or machining, which suffers from the aforementioned disadvantages, by wet working or machining. As coolant means are always provided on the machining equipment, it is obvious to use these for suppressing dust production, it merely being necessary to change the cooling fluid. Although in this way a large part of the chips can be combined with the coolant, this process is still unable to prevent the formation of suspended dust. It is particularly disadvantageous that the coolant circuit incorporated into the machine is made dirty by the dust and chips produced during cutting. The cleaning of the machine after working constitutes a time-consuming activity and the black, dirty sludge produced when machining graphite workpieces can only be removed from the machine with considerable effort and expenditure. The machine and the work areas remain coated with a layer of black dust, which can only be removed with considerable effort.

SUMMARY OF THE INVENTION

The present invention is in the field of wet working or machining and its object is to so develop a process of the aforementioned type during which the suspended dust produced at the machining station is completely trapped, combined with the fluid used and removed with the chips, without constricting the space around the machining area and without impeding vision of the tool and workpiece during machining or reducing access to the machining area.

According to the invention, the problem encountered with prior art processes is solved in that the fluid passing out of the discharge opening forms a closed cavity around the machining area which is separated from the surrounding space by at least one, fluid-produced, transparent, cylindrical or conical, closed fluid curtain.

The invention also relates to an apparatus, whose function is to permit the performance of the inventive process in an optimum manner. According to the invention, the prior art problem is solved in that at least one line constructed as a hollow ring is provided for the supply of a fluid, particularly a coolant, said hollow ring having at least one feed line issuing at a point of the ring. At the bottom of the ring cross-section an endless annular clearance is provided for the formation of a closed fluid ring flow.

BRIEF DESCRIPTION OF THE DRAWINGS

The invention is described in greater detail hereinafter in conjunction with the attached drawings, wherein like reference characters designate like parts. In the drawings:

FIG. 3 is a sectional elevational view illustrating still another embodiment of an apparatus for preventing dust production during the machining of workpieces; and FIG. 4 is a sectional elevational view of an apparatus similar to that of FIG. 3, but with a double hollow ring surrounding the tool spindle.

DETAILED DESCRIPTION OF THE PREFERRED EMBODIMENTS

Figure 1:
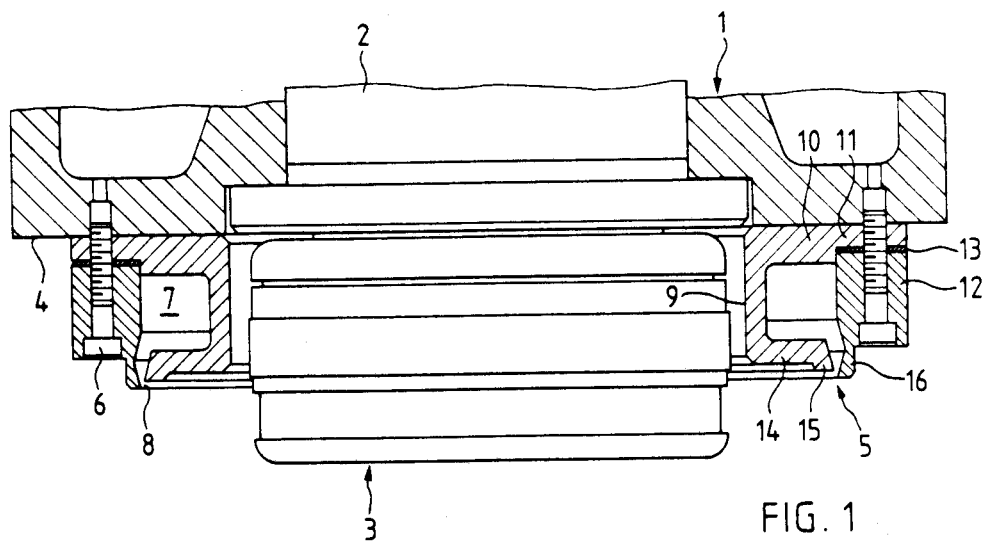
FIG. 1 is a vertical, sectional elevational view through apparatus comprising the present invention, for preventing dust production during machining, which is placed on the headstock or on the sleeve flange of a machine tool, with a main ring, surrounding a tool spindle mounted in the headstock.

In FIG. 1, the reference character 1 generally represents a partially illustrated headstock or sleeve flange of a machine tool, in which is mounted a rotary work spindle 2 equipped with a chucking device 3, permitting the holding of a machining tool not shown. The chucking device 3 can have any suitable construction, which will not be described in greater detail here, because it is not necessary for explaining the invention.

A hollow ring 5 is fixed by means of screws 6 to the face of the headstock 1 and surrounds the spindle 2 and the chucking device 3.

The hollow ring 5 includes a channel 7, which has a rectangular cross-section and is circumferentially provided in its bottom surface with an annular clearance 8 that forms an endless ring nozzle, through which can flow out a fluid, which forms a continuous fluid curtain.

The hollow ring 5 comprises two parts which are an outwardly circumferentially open U-shaped ring 9, whose headstock side leg 10 has a set-back position 11, and a cylindrical ring 12 with a flat gasket 13, which is clamped by screws to the leg 10. A leg 14 that faces the leg 10 is provided on its free end with a downwardly and radially outwardly curved edge 15 which, together with a radially inwardly curved edge 16 shaped onto the free end of the cylindrical ring 12 forms the annular clearance 8.

Figure 2:
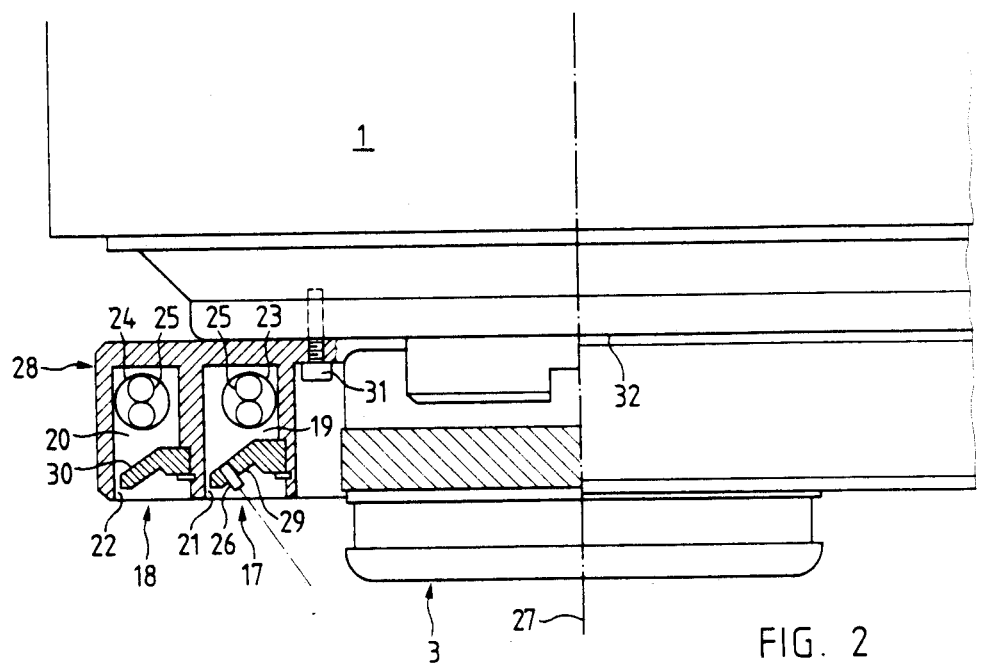
FIG. 2 is a view similar to that of FIG. 1, but illustrating apparatus with a double hollow ring surrounding the tool spindle.

The apparatus shown in FIG. 2 has two laterally juxtaposed hollow rings 17 and 18 each of which has a respective channel 19 and 20 with a rectangular cross section. On the side opposite to the headstock 1, both channels 19 and 20 have, in each case, one annular clearance 21 and 22 respectively, each forming an endless ring nozzle. When a fluid flows out of the annular clearances 21 and 22, two closed, annular fluid curtains are formed, which completely seal the space located within the two fluid flows from the surrounding area. For this purpose, for each of the channels 19 and 20 in FIG. 2, the openings 23 and 24 of a feed line are provided with fluid straightening fittings 25, which direct the inflowing fluid into the hollow rings 17 and 18 for forming a pair of closed concentric fluid curtains. Preferably, the openings 23 and 24 are on opposite sides. The hollow ring 5 according to FIG. 1 also has such an opening for a feed line and includes fluid straightening means which are not illustrated.

In the case of the hollow ring 17 of FIG. 2, on the side remote from headstock 1 a number of nozzles 26 are provided (only one nozzle is visible), the axes of which slope relative to the axis 27 of chucking device 3 and are used for cooling the tool.

The two hollow rings 17 and 18 comprise a ring 28, which has the two channels 19 and 20 in juxtaposed, concentric arrangements, as well as ring covers 29 and 30 closing channels 19 and 20. Annular clearances 21 and 22 are formed between the free edge of the ring cover 29 and 30 and the adjacent channel wall. The ring 28 is secured by screws 31 to the face 32 of the headstock 1.

In the case of the apparatus according to FIGS. 1 and 2, a pump (not shown) delivers a fluid into the hollow ring 5 or rings 17 and 18, preferably with an adjustable pressure. The hollow ring 5 is completely filled with the fluid and this flows out of the ring nozzle formed by the annular clearance 8 or 21 and 22 into the open. The outflowing fluid forms a closed curtain, within which a closed space is separated from the surrounding area. The workpiece is machined in this space. Due to the closed fluid curtain, the dust that is produced is trapped and combined within the fluid. Simultaneously the chips that are formed are washed away. As the fluid is transparent, it is possible to observe the working process in an unimpeded manner. If access to the machining area is required, this can take place in an unimpeded manner through the fluid curtain. The closed space is always maintained, independently of the workpiece shape. However, this presupposes that the fluid outflow from the ring nozzle is formed in a closed manner and parallel to the spindle axis 27. If only one feed line is provided to the hollow ring 5 or the hollow rings 17 and 18, the direction of the outflowing fluid can be at an angle with respect to the spindle axis 27. This can lead to areas on the workpiece, e.g. in the case of steep sides, which are no longer covered by the fluid flow, so that dust can pass out there.

If the embodiment according to FIG. 2 is used, the escape of dust which may occur with the embodiment according to FIG. 1 can be easily avoided if the feed line in one channel bring about a sloping outflow opposite to the sloping outflow in the other channel. The slopes of the two discharging fluid flows are then opposed, so that in the case of workpieces with sharp corners, and steeply dropping edges, it is possible to completely seal off the inner space.

Although the double hollow ring is able to completely compensate the disadvantage that, despite the straightening means provided in the feed line, the fluid flow leaving the annular clearance is not parallel, but slopes somewhat with respect to the spindle axis, this leads to a somewhat increased expenditure.

It must also be borne in mind that the fluid used for forming the fluid curtain takes up and removes the dust particles during machining. Although the spent fluid is cleaned in a cleaning plant even with great expenditure, cleaning cannot be continued to such an extent that all the particles are removed from the fluid. This means that the fluid always contains a certain quantity of material particles. The latter are deposited at different points, particularly in the vicinity of the annular clearance and when heaps of particles break away they may get stuck in the annular clearance, thereby preventing the formation of a completely closed fluid curtain.

The apparatus shown in FIG. 3, like that in FIGS. 1 and 2, is also arranged on the headstock 1 or sleeve flange of a machine tool and surrounds the spindle 2 provided with the chucking device 3.

The hollow ring 5 with channel 7 having an approximately rectangular cross section also issues into the annular clearance 8, which forms an endless ring nozzle, through which fluid can flow out in a continuous fluid curtain. The fluid curtain can be of a random size and has a height up to approximately 500 mm.

The hollow ring 5 is open towards the machining station, the ring cover 29 being fixed by screws 6 and further screws 13' to its spindle-side leg. The outer circumference-side leg 39, the hollow ring 5 and the free edge of the ring cover 29, form the annular clearance 8.

The channel 7, shown in FIG. 3, contains a built-in element 35, which constitutes a fluid permeable structure in said channel, which is constructed as a disc shaped annular ring and subdivides the channel 7 into an upper, roughly rectangular partial channel 7' and into a lower, roughly wedge-shaped partial channel 7''.

As required, the annular ring element 35 can be adapted to the particular embodiment of the apparatus. On the intake side, it has a deflecting ring 36, whose function is to so influence the fluid flow, that the fluid outflow at the annular clearance 8 takes place parallel to spindle axis 27. The deflecting ring 36 can be a circular disk, which is provided with a system of perforations or a blade grid. The annular ring 35 can also contain a filter ring 37, which holds back any further material particles in the fluid. These particles are mainly deposited on the outside wall of the upper partial channel 7' due to the centrifugal action. The deposited particles form a layer, from which coarser particles can break away and become deposited in the annular clearance 8 and thus break up the fluid curtain. The filter element 37 can comprise screens or sieves, whereof two or more layers can be inserted having different mesh sizes decreasing in the flow direction between 0.8 and 0.3 mm. preferably between 0.65 and 0.4 mm. On the outlet side, a straightening ring 38 can be provided on the annular ring element 35 and this also helps ensure a fluid flow parallel to the spindle axis 27. It is constructed as a perforated member or as a slotted grid. The annular element 35 is secured on the spindle side by the ring cover 29 and is consequently held in position.

As in FIG. 2, the apparatus shown in FIG. 4 has two juxtaposed, concentric hollow rings 17 and 18, whereof each has a respective channel 19 and 20 having a roughly rectangular cross-section. When fluid flows out of the annular clearances 21 and 22, once again two closed circular fluid curtains are formed, which seal the space located within the two fluid flows against the surrounding area in a complete manner. As in FIG. 2, for each of the channels 19 and 20, openings 23 and 24 of a feed line have straightening fittings 25 through which the fluid is supplied to the hollow rings 17 and 18. Appropriately, the openings 23 and 24 are located on opposite sides. In the case of the hollow ring 5 according to FIG. 3, such a feed line with straightening fittings can also be provided (not shown).

In the case of the hollow ring 7, according to FIG., 3 and the hollow rings 7 according to FIG. 4, several nozzles 26 (only one being visible) are provided on the side remote from headstock 1, their axis being directed in sloping manner against the spindle axis 27 and are used for cooling the tool.

The construction of the two hollow rings 17 and 18 shown in FIG. 4 corresponds to that of FIG. 2. They comprise the ring 28 having the two channels 19 and 20 and the two ring covers 29 and 30 terminating the channels 19 and 20. Between the free edge of ring covers 29 and 30 and the adjacent outer circumferential-side channel wall are formed the annular clearances 21 and 22. The ring 28 is fixed by screws 31 to the face 32 of the headstock 1, while the ring cover 29 is secured by screws 13 and the ring cover 30 is secured by a retaining ring 41.

In the construction according to FIG. 4 the same annular ring elements 35 are incorporated into the channels 19 of 20 of the hollow rings 17 and 18 as in channel 7 of the construction according o the FIG. 3 embodiment. The elements 35 form upper, roughly rectangular partial channels 19' and 20' and lower, roughly wedge-shaped partial channels 19'' and 20''. The elements 35 in FIG. 4 have the same parts as in FIG. 3, i.e. a deflecting ring 36, a filter element 37 and a straightening ring 38 and are held in position by covers 29 and 30.

In the embodiment according to FIG. 3, the element 35 ensures that the fluid flows out of the ring nozzle parallel to the spindle axis 27. Material particles in the fluid are simultaneously held back in the element 35.

In the embodiment according to FIG. 4, any escape of dust can even more reliably be prevented, because even material particles which pass through the inner fluid curtain as a result of their high kinetic energy are decelerated to such an extent that they are reliably trapped in the outer fluid curtain.

When machining graphite, the graphite dust trapped by the fluid curtain is not passed into the coolant system of the machine tool, but into a separate filter means (not shown). In the filter means, the back flowing medium containing material dust and particles is continuously cleaned and is returned to the system by means of a pump. Even though such a system leads to a constant cleaning of the fluid, it is still not possible to completely remove from the fluid all the material particles and particularly the smallest particles. The disturbances mentioned in connection with the apparatus according to FIG. 3 can be reliably avoided with the aid of the elements 35. In order to achieve a closed fluid curtain, in the case of the structures disclosed in FIGS. 1 to 4, the annular clearance 8 or 21 and 22, respectively, can be given a width of 0.24 to 0.4 mm. The fluid used may be a known coolant fluid, which contains roughly 97% water and roughly 3% of an additive which prevents corrosion and can be under a pressure of two or more bars.

In variants of the described apparatuses, more than one feed line can be used, so that the centrifugal action in the upper partial channel can be reduced, and optionally the deflecting ring 36 can be omitted.

As the fluid curtains entrain air on the outer faces, the atomspheric pressure decreases in the inner area thereof. Therefore the fluid curtain is no longer straight and instead contracts in an increasingly straight manner. To avoid this, in FIG. 3, one or more radial channels 40 are provided in the hollow ring. In the apparatus according to FIG. 4, apart from the radial channels 40, there are branch lines 42 for ventilating the space between the two fluid curtains. If these ventilation channels are closed, in the case of a contraction of the fluid curtains, it can be concluded that there is a complete seal of the inner area or of inner areas, respectively, of the fluid curtain or curtains. These ventilation channels can also be provided in the embodiment of FIGS. 1 and 2.

The described apparatuses can not only be used in the case of milling machines with one or more spindles, but also in other machine tools, it being possible to work, apart from graphite, other brittle, dust forming materials e.g. ceramic materials, whilst avoiding dust production. In the case of machines with a spindle mounted in a sleeve, the hollow ring can either be arranged on the headstock or on the sleeve.

I claim:

1. Apparatus for removing dust and chips from the working point of a machine tool having a spindle, said apparatus comprising:

first and second hollow annular channels concentrically disposed in adjacent relationship about the spindle, said channels sharing a common wall portion, said first and second channels respectively constitute first and second hollow horizontal rings, the first ring being an outer ring and having an outer wall, the second ring being an inner ring and having an inner wall, said common wall portion defining an inner wall for the first ring and an outer wall for the second ring, each ring having a corresponding separate annual clearance defining a corresponding endless nozzle whereby there are two nozzles, and means for introducing a pressurized fluid into both channels, said fluid being discharged from each nozzle as a separate closed fluid curtain which is substantially cylindrical with entrained dust and chips whereby two concentric spaced apart curtains are discharged.

2. Apparatus as set forth in claim 1 wherein the first nozzle is disposed adjacent the outer wall of the first ring and the second nozzle is disposed adjacent the common wall portion.

3. Apparatus as set forth in claim 2 wherein said means includes a first fluid feed line for the first ring and a second fluid feed line for the second ring, each feed line causing the curtain flow from the corresponding nozzle to be a sloping outflow opposite to the sloping outflow from the other nozzle.

4. Apparatus for removing dust and chips from the working point of a machine tool having a spindle, said apparatus comprising:

first and second hollow annular channels concentrically disposed in adjacent relationship about the spindle, said channels sharing a common wall portion, at least one channel having an annual clearance formed on the underside thereof which defines an endless nozzle; said first and second channels constituting first and second rings respectively, the first ring being disposed above the second ring, the first ring having an upper wall, the second ring having a lower wall, the common wall portion defining a lower wall for the first ring and an upper wall for the second ring, said nozzle being in the second ring; and means for introducing a pressurized fluid into both channels, said fluid being discharged from the nozzle as a closed fluid curtain which is substantially cylindrical with entrained dust and chips.

5. The apparatus of claim 4 wherein said common wall is fluid permeable.

6. Apparatus as set forth in claim 5 further including additional first and second rings, the additional first ring being horizontally disposed concentrically about the said first ring and being otherwise identical thereto, the additional second ring being horizontally disposed concentrically about the said second ring and being otherwise identical thereto.

7. Apparatus as set forth in claim 5 wherein the common wall portion is a deflecting ring to cause the curtain to be cylindrical about the spindle as an axis.

8. Apparatus as set forth in claim 7 wherein said deflecting ring is also a filter.

9. Apparatus as set forth in claim 7 wherein the first ring has a cross section having the substantial shape of a rectangle.

10. Apparatus as set forth in claim 9 wherein the second ring has a cross section in the substantial shape of a rectangle.

* * * * *